US009505406B2

(12) United States Patent
Zhou et al.

(10) Patent No.: US 9,505,406 B2
(45) Date of Patent: Nov. 29, 2016

(54) AUTOMOBILE LAMP DEVICE AND METHOD FOR TRANSMITTING SIGNALS THROUGH LIGHT THEREOF

(71) Applicant: SHANGHAI KOITO AUTOMOTIVE LAMP CO., LTD, Shanghai (CN)

(72) Inventors: Shengyan Zhou, Shanghai (CN); Jinlong Ao, Shanghai (CN); Jingquan Li, Shanghai (CN); Yuan Zhang, Shanghai (CN)

(73) Assignee: SHANGHAI KOITO AUTOMOTIVE LAMP CO., LTD, Shanghai (CN)

( * ) Notice: Subject to any disclaimer, the term of this patent is extended or adjusted under 35 U.S.C. 154(b) by 0 days.

(21) Appl. No.: 15/033,127

(22) PCT Filed: Dec. 18, 2013

(86) PCT No.: PCT/CN2013/089775
§ 371 (c)(1),
(2) Date: Apr. 29, 2016

(87) PCT Pub. No.: WO2015/062146
PCT Pub. Date: May 7, 2015

(65) Prior Publication Data
US 2016/0257306 A1 Sep. 8, 2016

(30) Foreign Application Priority Data

Oct. 30, 2013 (CN) .......................... 2013 1 0533122

(51) Int. Cl.
B60W 30/09 (2012.01)
G08G 1/16 (2006.01)
H04L 29/06 (2006.01)
G07C 5/00 (2006.01)
G08C 23/04 (2006.01)

(52) U.S. Cl.
CPC .............. *B60W 30/09* (2013.01); *G07C 5/008* (2013.01); *G08C 23/04* (2013.01); *G08G 1/163* (2013.01); *H04L 65/00* (2013.01)

(58) Field of Classification Search
CPC ..... B60W 30/09; G08G 1/163; G08C 23/04; G07C 5/008; H04L 65/00
See application file for complete search history.

(56) References Cited

U.S. PATENT DOCUMENTS

| 5,179,561 A * | 1/1993 | Izawa | .................. G06F 11/085 714/703 |
| 6,831,571 B2 * | 12/2004 | Bartel | ..................... E21B 47/12 166/339 |
| 2006/0152383 A1 * | 7/2006 | Yamate | ................. E21B 47/123 340/853.1 |
| 2007/0242337 A1 * | 10/2007 | Bradley | ............... B60Q 1/0017 359/237 |

(Continued)

Primary Examiner — Richard Camby
(74) Attorney, Agent, or Firm — CBM Patent Consulting, LLC

(57) ABSTRACT

It divides the network communication protocol for the communication between automobile into a software protocol layer (L1), a signal protocol layer and a physical protocol layer wherein the software protocol layer is used for checking coding and decoding the data required to be sent and received by a system, and the signal protocol layer is used for performing combined coding of data package signals and basic light signal on data packages produced by the software protocol layer according to the protocol agreement, and the physical protocol layer is used for converting digital signals and light signals mutually. A device comprises a light receiving apparatus arranged at the head of the automobile and a light emitting device, which collects the operating status information of automobile, performs information exchange with surrounding automobiles through digital information, arranged at the tail of the automobile.

13 Claims, 7 Drawing Sheets

(56) References Cited

U.S. PATENT DOCUMENTS

2007/0242338 A1* 10/2007 Bradley ............... B60Q 1/0017
              359/237

2007/0242339 A1* 10/2007 Bradley ............... B60Q 1/0017
              359/237
2008/0007421 A1* 1/2008 Liu ...................... G01V 11/002
              340/853.3

* cited by examiner

Drawings

AUTOMOBILE LAMP DEVICE AND METHOD FOR TRANSMITTING SIGNALS THROUGH LIGHT THEREOF

This application is the U.S. national phase of International Application No. PCT/CN2013/089775 Filed on on 18 Dec. 2013 which designated the U.S. and claims priority to Chinese Application Nos. CN201310533122.2 filed on 30 Oct. 2013, the entire contents of each of which are hereby incorporated by reference.

FIELD OF THE INVENTION

This invention involves intelligent transportation and intelligent automobile research field, to be specific, it involves an automobile lamp device and a method for emitting signals through light thereof.

BACKGROUND OF THE INVENTION

With the continuous development of economy and transportation, automobiles have become people's indispensable means of transportation. But with the constant improvement of automobile usage rate, traffic accidents also present a rising trend year by year. According to statistics, in all motor automobile accidents, the traffic accidents caused by lane departure account for twenty percent of all traffic accidents, therefore, in recent years, many research institutions at home and abroad have begun the study on automotive active safety technology.

The automotive active safety systems provided by the existing technology adopt radar and camera sensors, these systems judge the driving states of surrounding automobile through signal processing method; when finding there is a potential danger, they can judge in advance and avoid the occurrence of accident by means of warning and auxiliary brake.

But these studies have focused on passive receiving sensors like camera and radar, through the ways of signal processing and computer vision algorithm, they are able to judge the occurrence of dangerous situation; their essence is an estimation and approximation to the driving mode of surrounding automobile. The accuracy of this kind of estimation and approximation depends not only on the design of signal processing and algorithm, but also on the external environmental factors. For example, the active safety system based on camera sensor will generate false alarm and inspection omission when working at night; the active safety system based on radar sensor will present large deviation in the automobile lateral motion component.

Therefore, the defects of existing systems are mainly summed up into two points: 1. The algorithm dependence is high; 2. There are more conditions limited by the inherent characteristics of sensor. These defects will make the systems lose their functions and significances.

SUMMARY OF THE INVENTION

The purpose of this invention is to provide automobile lamp device and the method for it to transfer signals through lamplight, realize the signal emitting between the front automobile and rear automobile, effectively judge the potential dangerous situation and improve the driving safety of automobile so as to solve the problem of poor reliability of automotive active safety systems which prevent traffic accidents due to collision of automobile in the existing technology.

To achieve the above purpose, the scheme of this invention is as follows:

A kind of automobile lamp device, including the head lamp arranged at the head of the automobile and tail lamp arranged at the tail of the automobile. Inside the head lamp, there is a lamp light receiving apparatus; inside the tail light, there is a lamp light emitting apparatus. the aforesaid lamp light emitting apparatus is composed of bus data receiver, emitting end microcontroller, lamp driver and lamps, The input end of aforesaid bus data receiver connects with the automobile's CAN bus, it's used to collect the operating data of the automobile. The input end of aforesaid emitting end microcontroller connects with the output end of bus data receiver, it's used to acquire the operating data of the automobile and check the code. The output end of emitting end microcontroller connects with the input end of lamp driver, it's used to generate data after checking coding. The output end of aforesaid lamp driver drives and connects with the tail lamps described, it's used to drive the luminance of tail lamps; the aforesaid tail lamps are used to generate the light signals including the operating data of the automobile and send them out.

The aforesaid lamp light receiving apparatus is composed of lens, photosensitive module and receiving end microcontroller, the aforesaid lens is used to conduct focusing processing for the light signal received and send the light signal processed to photosensitive module. The aforesaid photosensitive module connects with AD port of receiving end microcontroller, it's used to send the voltage signal converted from light signal to receiving end microcontroller. The output end of aforesaid receiving end microcontroller connects with the input end of automobile controller, it's used to conduct analog-digital conversion and filtering processing for the voltage signal it receives, and output control signal to automobile controller.

The aforesaid lamp light receiving apparatus and lamp light emitting apparatus include the software protocol layer, signal protocol layer and physical protocol layer. The emitting end microcontroller and the receiving end microcontroller constitute software protocol layer and signal protocol layer. The lamp driver, lamp, lens and photosensitive module constitute physical protocol layer, and the software protocol layer is used for checking coding and decoding the data required to be sent and received, generating data package signal. The signal protocol layer is used for combined coding for the key light signal and data package signals produced by the software protocol layer, and the physical protocol layer is used for converting digital signals and light signals mutually.

The aforesaid photosensitive module receives the ray of light focused by the lens and samples the ray of light with the predetermined frequency, converts the optical signal after sampling into voltage signal, then conducts operational amplification for the above-mentioned voltage signal; then it sends the amplified voltage signal to AD acquisition port of receiving end microcontroller, then processes the acquired signal and obtains the final digital signal, thus completing the receiving of digital signal.

The check code of data is obtained from the automobile's operational data through code check, add the aforesaid check code to the tail of automobile's operational data, then the data after code check is obtained.

The photosensitive module is photosensitive sensor.

This invention also provides a method of signal transmission through ray of light by using above device, it includes the following steps:

(1) Lamp light receiving apparatus is set in the head lamps of front and rear automobile respectively, and lamp light emitting apparatus is set in the tail lamps; the aforesaid lamp light receiving apparatus and lamp light emitting apparatus both include software protocol layer, signal protocol layer and physical protocol layer. The software protocol layer of lamp light emitting apparatus includes check encoder and the software protocol layer in lamp light receiving apparatus includes check decoder. The signal protocol layer in lamp light emitting apparatus includes data package signal transmitter, basic light generator and data signal generator, the signal protocol layer in lamp light receiving apparatus includes data package signal receiver, the physical protocol layer in lamp light emitting apparatus includes signal modulator and lamplight generator and the physical protocol layer in lamp light receiving apparatus includes light signal receiver and signal demodulator.

(2) The lamp light emitting apparatus in the front automobile collects its own operational data via bus and the check encoder of software protocol layer conducts check coding for the aforesaid operational data, thus obtaining the check code of operational data, then it transmits the data after code check to data package signal transmitter; check code is used to check the data sent and received in signal protocol layer.

(3) The data signal generator in the signal protocol layer of lamp light emitting apparatus of the front automobile waits for the rising edge of key light signal generated by key light generator, when receiving the rising edge signal, it will, according to the data package generated by data package signal generator, generate data signal waveform. The data signal waveform combines with the key light signal waveform, after signal modulation, analog-modulated luminance signal is generated, and the modulated PWM signal which corresponds to analog-modulated luminance signal will drive the tail lamps through voltage driver and generate optical signal, through the luminance difference of optical signal, the data that needs to be sent will be contained in the ray of tail light, sent to air medium in the form of luminance and received by the rear automobile, thus completing data transmission.

(4) The photosensitive module in the light signal receiver in the physical protocol layer of lamp light receiving apparatus in the rear automobile receives the optical signal sent by the front automobile, after filtering and deburring for the analog signal received by photosensitive module by the filter module, the filtrated signal is obtained, then analog-digital converter will obtain the signal through analog-digital conversion for the filtrated signal. Through sampling average for the electrical level of reference voltage calibration start cycle, reference signal is obtained; input the signal obtained by analog-digital converter and the reference signal to signal comparator for signal comparison, digital signal is obtained, thus completing data receiving.

The lamp light receiving apparatus of rear automobile will compare the digital signal it gets with its own position and speed data, obtaining the relative position relationship between the front automobile and the rear automobile; if there is a risk of collision, the rear automobile will immediately take the corresponding braking measure.

The rear automobile receives the speed and position information sent by the front automobile and compares the information with its own speed and position information, obtaining the time of collision that is about to happen to the automobile, namely:

$$T = \frac{\sqrt{(x_B - x_A)^2 + (y_B - y_A)^2}}{V_A - V_B}$$

Of which, T is the time of collision that is about to happen to the two automobile, when T is less than 2 s, indicating there is a potential risk of collision, the automobile controller of rear automobile will control the braking system to fill oil; when T is less than 1 s, the automobile controller of rear automobile will control brake pedal to take braking measure;

Of which: $V_B$ represents the speed of front automobile;

$(x_B, y_B)$ represents GPS positioning coordinates of front automobile;

$V_A$ represents the speed of rear automobile;

$(x_A, y_A)$ represents the GPS positioning coordinates of rear automobile.

The analog signal received by aforesaid photosensitive module is:

$$S_{rec} = f(S_{send}) + N_{air}$$

Of which, $S_{rec}$ is the analog signal received, $S_{send}$ is original optical signal, $f()$ is attenuation function in the process of optical propagation, $N_{air}$ is outside noise signal.

The check coding method for the operational data of automobile in Step (2) is:

$$v = 256 \times \left(\sum_{i=0}^{N} f_1(d_i)\right) + \left(\sum_{i=0}^{N} f_2(d_i)\right)$$

$$f_1(d_i) = \sum_{j=0}^{7} ((d_i \,\&\, (1 << j)) >> j), i = 0, 1, 2, \ldots N$$

$$f_2(d_i) = \sum_{j=0}^{7} \overline{((d_i \,\&\, (1 << j)) >> j)}, i = 0, 1, 2, \ldots N$$

Of which, N is the length of signal level, v is the final check code, the value range of $d_i$ is integers from 0 to 255, $f_1(d_i)$ represents the number of binary digits whose value is 1 in $d_1$, $f_2(d_i)$ represents the number of binary digits whose value is 0 in $d_i$.

The signal protocol layer stipulates the reference luminance calibration start cycle as follows: set valid period of lamplight in the signal protocol layer; after the rising edge of valid period of lamplight is generated, the carrier luminance whose duration is the first predetermined cycle will be generated, and this first predetermined cycle is the reference luminance calibration start cycle.

The check code of data is obtained through check coding of automobile's operational data, after the aforesaid check code is added to the tail of automobile's operational data, the data after code check is obtained.

This method is used to check the data received in the physical protocol layer in lamp light receiving apparatus: within reference luminance calibration start cycle and reference luminance calibration stop cycle, sample the optical signal received by rear automobile respectively and obtain two reference luminance voltage averages, if their voltage difference is greater than 5%, the signal received shall be deemed invalid, the data received this time shall be discarded; the aforesaid reference luminance calibration stop cycle means that the carrier luminance whose duration is the second predetermined cycle is sent after the data signal is sent, the duration of the second predetermined cycle is the reference luminance calibration stop cycle.

The method is used to check the data sent and received in signal protocol layer: when the data received in physical protocol layer is valid, in the signal protocol layer of lamp light receiving apparatus, when the data received by the rear automobile is inconsistent with the data sent from the front automobile in check code, the data received this time shall be discarded.

The beneficial effects achieved by this invention: (1) This invention conducts protocol coding processing for the automobile's operational data collected by bus data receiver in accordance with software protocol layer and signal protocol layer, and sends the encoded data to lamp driver, the latter will drive the luminance of automobile tail lamps; through the difference of tail light luminance, the data that needs to be sent is contained in the ray of tail lamps, so as to effectively realize the communication between automobile, lamps and automobile and lamps; it's helpful to realize intelligent transportation and intelligent automobile, thus improving the driving safety and effectively reducing the potential accidents.

(2) This invention enables the drivers and automobile to realize information interaction in the form of quantifiable information—digit, it can make the computer more accurately judge the status of automobile around the driving environment, precisely judge the potential danger and improve driving safety; at the same time, this invention is also helpful to realize car networking and provide effective equipment support for intelligent transportation and network transportation.

(3) The method of this invention is to check the data received after the luminance information is received; judgment is made through the voltage difference of average values of reference luminance voltage before and after the reference luminance calibration cycle; if the voltage different is greater than 5%, it will be deemed that the signal received is greatly affected by environment in the emitting process and the data received is invalid and shall be discarded.

(4) This invention further checks the data received and sent in signal protocol layer; when finding the check codes for the data sent and received are inconsistent after check, the data sent this time shall be deemed invalid and shall be discarded; through twin check, the accuracy to judge the potential danger of car crash will be further improved and the automobile driving safety will be improved.

(5) This invention makes the lamp light receiving apparatus and lamp light emitting apparatus installed inside the automotive lamps, which can not only make the lamps have the function of lighting, but also realize the optical communication between automobile.

DESCRIPTION OF THE PREFERRED EMBODIMENT

Figure 1:
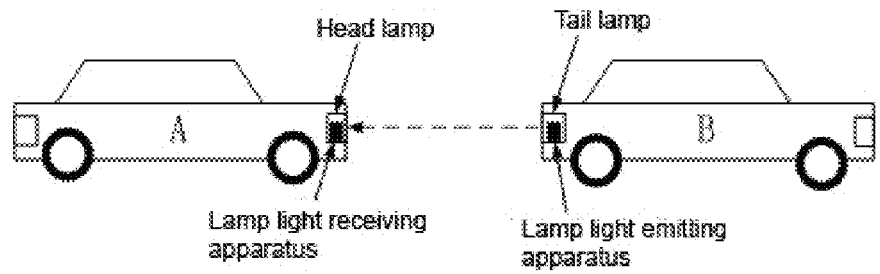
FIG. 1 is the structural diagram for the installation of automotive lamp device in this invention.

Next, this invention will be further explained in detail by combining with the figures. Example of device implementation for this invention:

As shown in FIG. 1, the lamp device in this invention includes the head lamps installed at the head of the automobile and the tail lamps installed at the tail of the automobile; inside the head lamp, there is lamp light emitting apparatus E1 and inside the tail light, there is lamp light receiving apparatus E2.

In this implementation example, the lamp light emitting apparatus is mounted on the CAN bus of automobile, collect the data that the automobile itself needs to send, such as speed data, brake pedal data and accelerator data, etc; when automobile A travels to the rear of automobile B, because the lamp light receiving apparatus in head lamp of automobile A aligns with the lamp light emitting apparatus in tail light of automobile B, automobile A can receive the data sent by automobile B, such as speed data, brake pedal data and accelerator data, etc.

Figure 2:
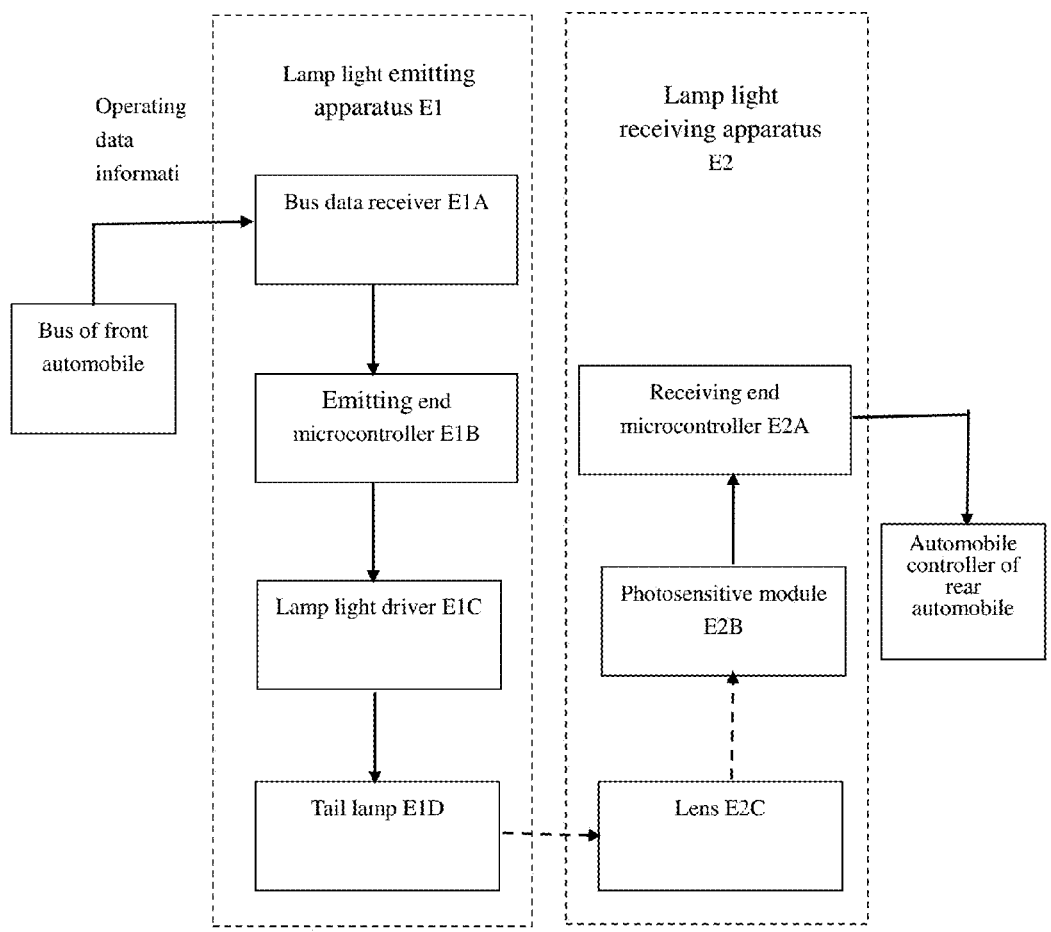
FIG. 2 is the structural schematic diagram of lamp device in this invention.

As shown in FIG. 2, the lamp light emitting apparatus E1 in this implementation example consists of bus data receiver E1A, emitting end microcontroller E1B, lamp driver E1C and tail light E1D; lamp light receiving apparatus E2 consists of lens E2C, photosensitive module E2B and receiving end microcontroller E2A; among them, the photosensitive module is a photosensitive sensor.

The input end of bus data receiver E1A connects with CAN bus of automobile, responsible for collecting the automobile state information on the CAN bus of automobile, receiving and sending the automobile state information to emitting end microcontroller E1B, the latter will send the state information in the form of packet.

The input end of emitting end microcontroller E1B connects with the output end of bus data receiver, receiving the automobile state information sent from bus data receiver E1A; it conducts coding processing for the automobile state information and sends the encoded data to lamp driver E1C, the latter will drive the luminance of tail lamps.

The input end of lamp driver E1C connects with the output end of emitting end microcontroller, receiving the data sent by emitting end microcontroller E1B; the output end driver of lamp driver connects with tail light E1D, realizing the drive to tail light E1D.

Tail light E1D, on the basis of the traditional lamp lighting effect, realizes containing the data that needs to be sent in the ray of lamplight through the luminance difference of lamp and sending it in the form of light.

The role of lens E2C is to conduct focusing processing for the light received and control the focus on photosensitive sensor E2B.

Figure 3:
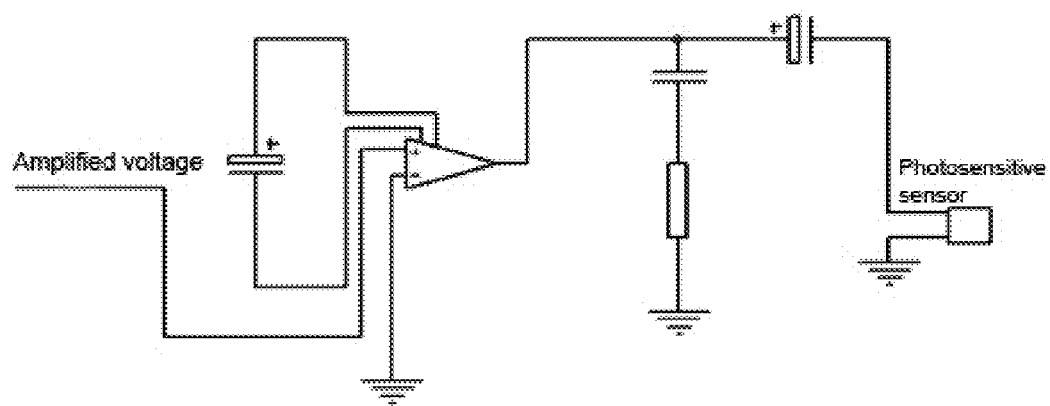
FIG. 3 is the structural schematic diagram of signal amplifier in this invention.

Photosensitive sensor E2B receives the ray of light focused by lens E2C, samples the light with certain frequency and converts the optical signal after sampling into the corresponding voltage signal, conducts operational amplification to voltage signal and sends the amplified voltage signal to AD acquisition port of receiving end microcontroller E2A; the schematic circuit of operational amplification is shown in FIG. 3.

Figure 4:
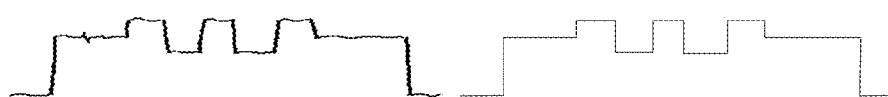
FIG. 4 is the contrast diagrams of actual sending signal and the actual sampling signal in this invention.

AD acquisition port of receiving end microcontroller E2A connects with photosensitive sensor E2B, the receiving end microcontroller E2A collects the voltage signal from photosensitive sensor E2B through AD acquisition port, the voltage collected is as shown in FIG. 4; the receiving end microcontroller E2A conducts analog-digital conversion and filtering processing for the signal collected, thus getting the final digital signal.

Figure 5:
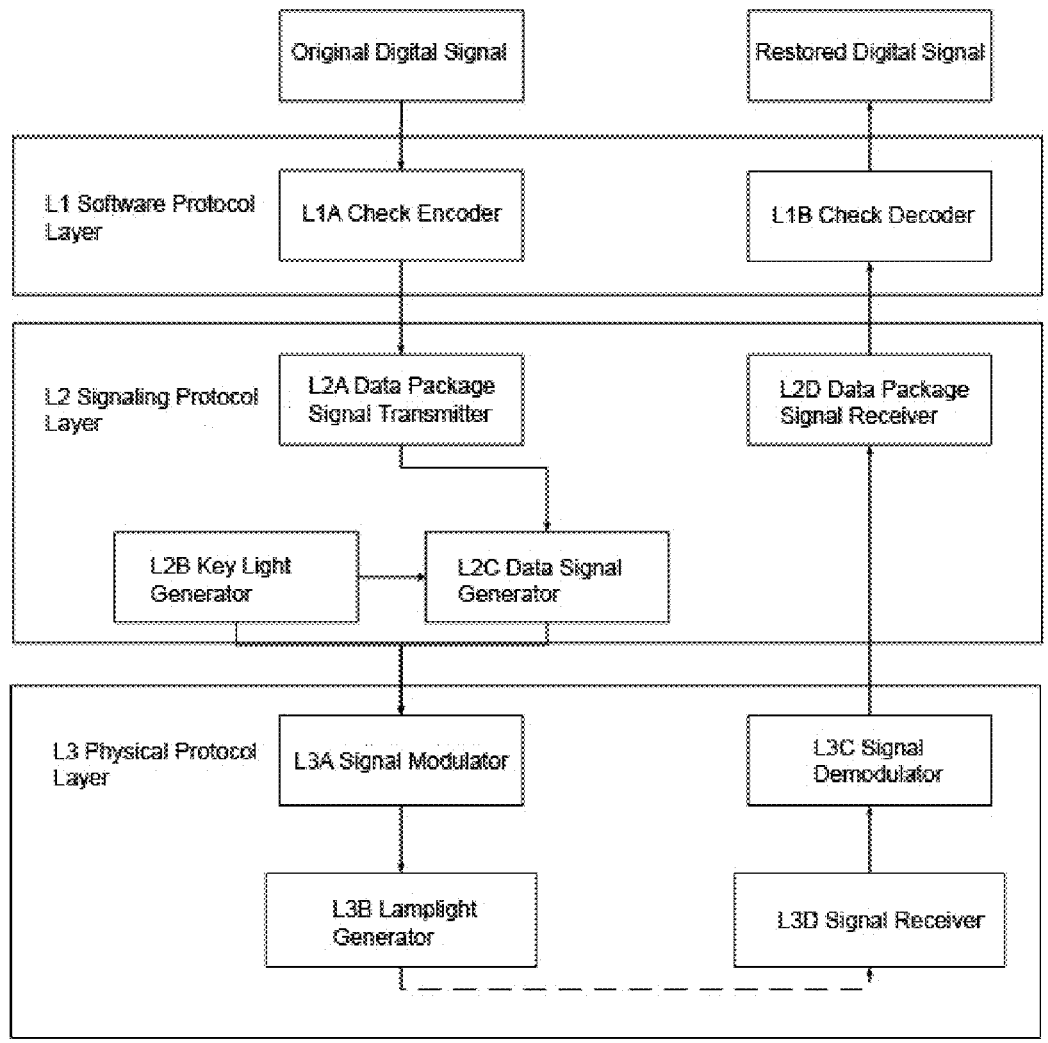
FIG. 5 is the structural schematic diagram of protocol layers in this invention method.

As shown in FIG. 5, the lamp light emitting apparatus and lamp light receiving apparatus in this implementation example are divided into software protocol layer L1, signal protocol layer L2 and physical protocol layer L3. Software protocol layer L1 is responsible for check encoding and decoding for the data that the device needs to send and receive, including check encoder L1A and check decoder L1B. Check encoder L1A will obtain the check code through calculating the signal data that the device needs to send and add the check code to the tail of numeric string.

The check encoding method for data is:

$$v = 256 \times \left(\sum_{i=0}^{N} f_1(d_i)\right) + \left(\sum_{i=0}^{N} f_2(d_i)\right)$$

$$f_1(d_i) = \sum_{j=0}^{7} ((d_i \,\&\, (1 << j)) >> j), i = 0, 1, 2, \ldots N$$

$$f_2(d_i) = \sum_{j=0}^{7} \overline{((d_i \,\&\, (1 << j)) >> j)}, i = 0, 1, 2, \ldots N$$

Of which, N is the length of signal level, v is the final check code, the value range of $d_i$ is integers from 0 to 255, $f_1(d_i)$ represents the number of binary digits whose value is 1 in $d_i$, $f_2(d_i)$ represents the number of binary digits whose value is 0 in $d_i$.

The signal protocol layer L2 is responsible for the realization of combined coding of data package signal and key light signal for the data package generated by software protocol layer L1 in accordance with the provisions of the protocol; it's composed of data package signal transmitter L2A, key light generator L2B, data signal generator L2C and signal receiver L2D; among them, the data package signal transmitter L2A, key light generator L2B and data signal generator L2C are used to complete signal transmission and data package signal receiver L2D is used to complete signal receiving.

Physical protocol layer L3 is used for the mutual conversion of digital signal and optical signal in this invention; it's composed of emitting end signal modulator L3A, lamplight generator L3B, receiving end light signal receiver L3D and signal demodulator L3C.

In this implementation example, the emitting end microcontroller and the receiving end microcontroller constitute software protocol layer and signal protocol layer; lamp driver, lamp, lens, and photosensitive module constitute physical protocol layer.

Figure 6:
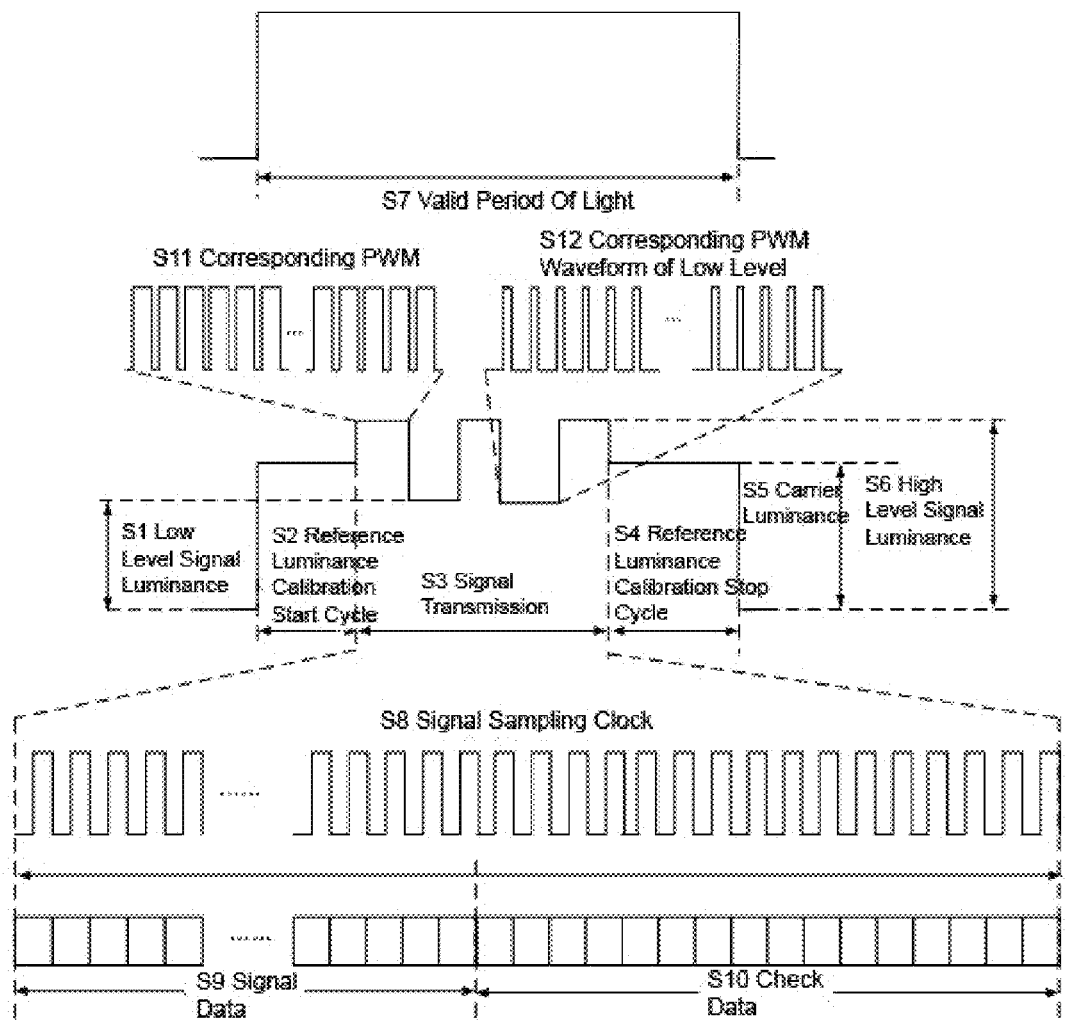
FIG. 6 is the light signal luminance and timing sequence agreement in this invention.

This invention stipulates voltage and timing specifications for the optical signal generated by the signal protocol layer L2, including low level signal voltage S1, reference luminance calibration start cycle S2, signal transmission cycle S3, reference luminance calibration stop cycle S4, carrier voltage S5, high level signal voltage S6 and lamplight valid period S7; the working relationships between voltage and timing specifications stipulated are as follows:

As shown in FIG. 6, after the rising edge of light valid period S7 is generated, carrier luminance S5 whose duration is reference luminance calibration start cycle S2 will be generated, then, the system will, according to the binary data signal generated by data signal generator L2C, of which, the luminance of data signal 1 is high level signal luminance S6, PWM waveform S11 corresponds with it; the luminance of data signal 0 is low level signal luminance S1, PWM waveform S12 corresponds with it, after experiencing the time duration of signal transmission cycle S3, the data signal transmission is completed, the system will begin to transmit the carrier luminance S5 whose duration is reference luminance calibration stop cycle S4.

According to the above protocols, the specific process for the lamp light receiving apparatus in this implementation example to receive the digital signal is as follows:

According to the voltage and timing specifications for light signal defined in FIG. 6, the receiving end microcontroller E2A compares the detected rising edge signal with threshold value; when signal value is greater than the threshold, it will judge the valid period S7 of light has begun; according to reference luminance calibration start cycle S2 stipulated in the protocol, the average value of acquisition voltage in this period of time will be calculated to serve as carrier voltage S5; compare the sampling value with carrier voltage S5, if the sampling value is greater than the predetermined threshold value, signal high level will be judged; otherwise, signal low level will be judged.

The total time for sampling of digital signal is the signal transmission period S3 stipulated in the protocol; after the sampling time reaches the duration of signal transmission period S3, collect the voltage average within the duration of reference luminance calibration cycle S4, compare the value with carrier voltage S5; if they are equal, the sampling physical layer this time is valid; otherwise, the sampling physical layer this time is invalid. If the sampling physical layer this time is valid, for signal data S9 and check data S10 which are obtained through sampling within signal transmission period S3, the receiving end microcontroller E2A will judge through calculation, if the computed result of signal data S9 is equal to check data S10, the sampling signal layer this time is valid; otherwise, the sampling signal layer this time is invalid; for the data obtained through sampling by receiving end microcontroller E2A within one light valid period, if the physical layer and signal layer are both valid, the sampling this time is successful, then the data receiving and transmission this time is successful.

The following will specifically describe an application example of lamp device in this invention in anti-collision of automobile.

As shown in FIG. 1, when automobile A drives to the rear of automobile B, the lamp light emitting apparatus in tail light of automobile B will collect the data that automobile B needs to send, namely: automobile speed $V_B$ and automobile GPS positioning coordinates ($x_B$, $y_B$), which will be sent by lamp light emitting apparatus in automobile B; after automobile A receives the automobile speed $V_B$ and automobile GPS positioning coordinates ($x_B$, $y_B$) sent by automobile B, through comparison with automobile A's own speed $V_A$ and its own GPS positioning coordinates ($x_A$, $y_A$), the time of collision that is about to happen to the two automobile will be obtained, namely:

$$T = \frac{\sqrt{(x_B - x_A)^2 + (y_B - y_A)^2}}{V_A - V_B}$$

T is the time of collision obtained through calculation, when T is less than 2 s, it indicates there is a potential risk of collision, automobile A will begin fill oil to braking system; when T is less than 1 s, it indicates the risk of collision is further improved, collision will happen if braking measure is not adopted, so braking measure shall be adopted by controlling brake pedal.

Figure 7:
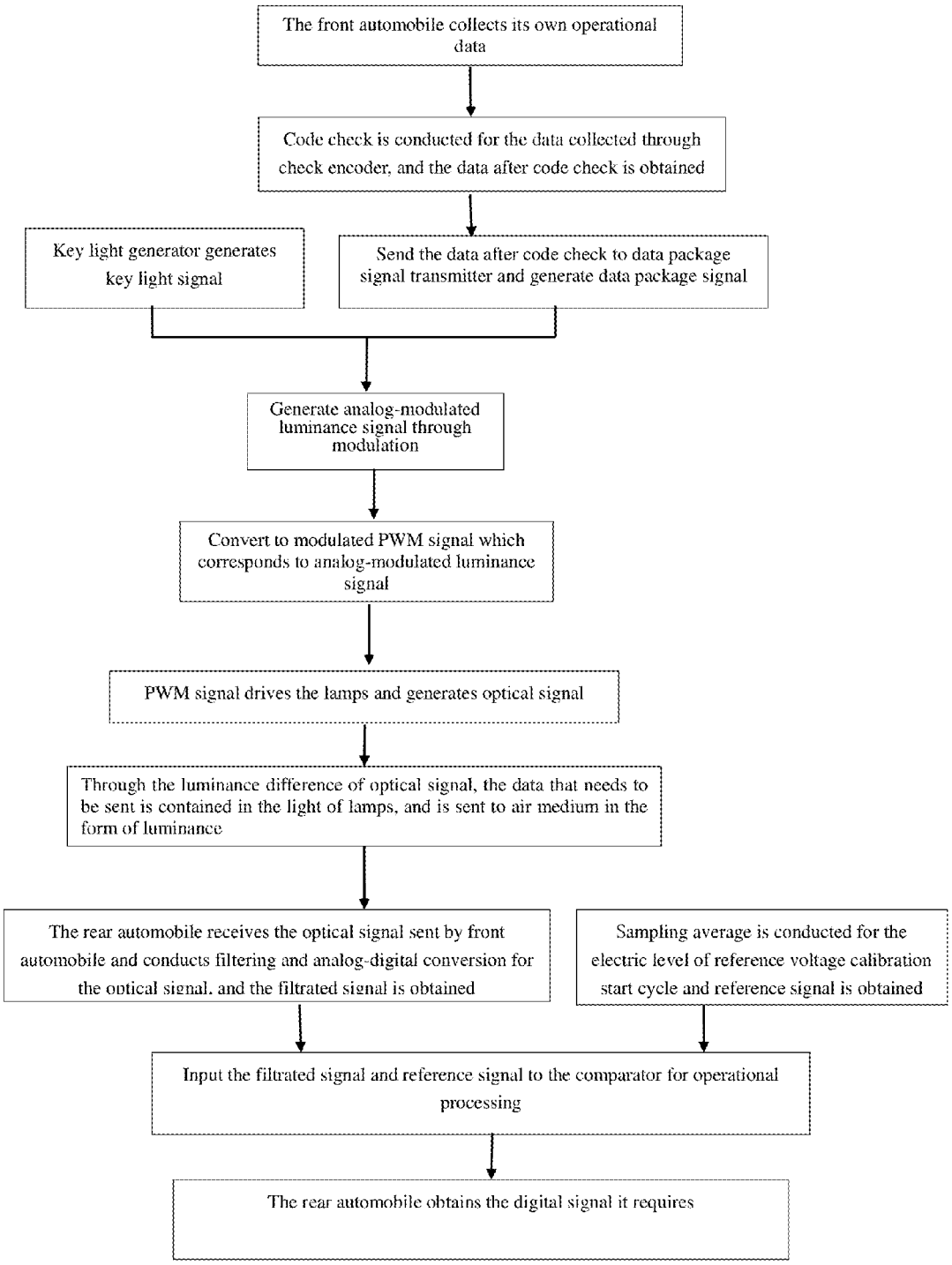
FIG. 7 is the flow diagram of this invention method.

The method implementation example of this invention:

As shown in FIG. 7, the method of this invention includes the following steps:

(1) A lamp light receiving apparatus is set inside the head lamps of front automobile and rear automobile and a lamp light emitting apparatus is set inside the tail lamps respectively; the aforesaid lamp light receiving apparatus and lamp light emitting apparatus both include a software protocol layer, a signal protocol layer and a physical protocol layer; the software protocol layer in lamp light emitting apparatus includes check encoder; the software protocol layer in lamp light receiving apparatus includes check decoder; the signal protocol layer in lamp light emitting apparatus includes data package signal transmitter, key light generator and data signal generator; the signal protocol layer in lamp light receiving apparatus includes data package signal receiver; the physical protocol layer in lamp light emitting apparatus includes signal modulator and lamplight generator; the physical protocol layer in lamp light receiving apparatus includes light signal receiver and signal demodulator;

(2) The lamp light emitting apparatus of front automobile collects its own operational data via bus and the check encoder in software protocol layer conducts code check for the aforesaid operational data, gets the check code of operational data and sends the data after code check to data package signal transmitter; the check code is used for checking the data sent and received in signal protocol layer.

(3) The data signal generator in signal protocol layer of lamp light emitting apparatus in the front automobile waits for the rising edge of key light signal generated by key light generator, when it receives the rising edge signal, it will, according to the data package generated by data package signal transmitter, generate data signal waveform and combine the data signal waveform with the key light signal waveform, after signal modulation, it will generate analog-modulated luminance signal, which will drive the tail lamps through voltage driver together with modulated PWM signal which corresponds to analog-modulated luminance signal and generate optical signal; through the luminance difference of optical signal, the data package that needs to be sent is contained in the tail lamps and sent to air medium in the form of luminance, and it's received by rear automobile, thus data transmission is completed;

(4) The photosensitive module in light signal receiver in physical protocol layer of lamp light receiving apparatus in the rear automobile receives the optical signal sent by the front automobile, after filtering and deburring by filter module for analog signal received by photosensitive module, the filtrated signal is obtained, then through analog-digital conversion for the filtrated signal, the analog-digital converter gets the signal, through sampling average for the electric level of reference voltage calibration start cycle, reference signal is obtained; input the signal obtained by analog-digital converter and reference signal to the signal comparator for signal comparison, digital signal is obtained, thus data receiving is completed.

Figure 8:
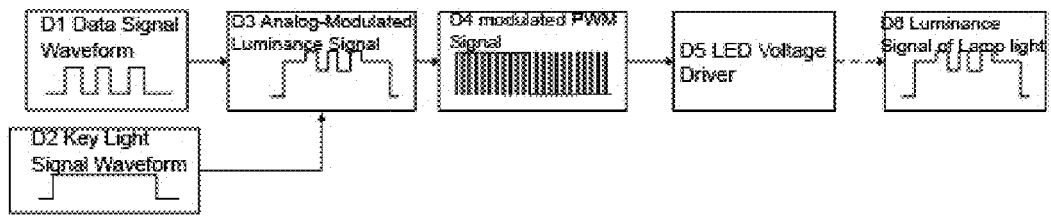
FIG. 8 is the process to encode the automobile data signal collected into optical signal.

As shown in FIG. 8, the signal transmission process of this invention is as follows:

A data signal generator L2C in signal protocol layer L2 will wait for the rising edge signal generated by key light generator L2B; when receiving the rising edge signal, it will, according to the data package generated by data package signal transmitter L2A, generate data signal waveform D1; combine D1 with key light signal waveform D2, through signal modulator L3A), according to the signal luminance and timing specifications defined in FIG. 2, analog-modulated luminance signal D3 will be generated, then analog-modulated luminance signal D3 will be converted into modulated PWM signal D4, the latter will drive LED through LED voltage driver and generate light signal D6, which will be sent to air medium in the form of luminance.

When lamp light emitting apparatus collects the following digital signal strings that need to be sent: 1, 2, 3, 4, 5, 6, 7, 8 and 9, the binary system modes of such data are 00000001, 00000010, 00000011, 00000100, 00000101, 00000110, 00000111, 00001000 and 00001001; according to the calculation formula of check code, the check code of these digital signal strings is 3897, their binary system is 0000111100111001, through signal modulator, digital signal strings and their check code are packed into the following data package: 00000001000000100000001100000100-00000101000001100000011100001000000001001000011-11001 11001; then transform these signals to PWM values that need to be sent within each data bit cycle through signal modulator; since the data package is too long, here, PWM duty ratio of carrier luminance and the PWM duty ratios of the first eight digits of data package are listed, they are as follows respectively:

carrier voltage is 50%; voltage values of the first eight digits of data package are 30%, 30%, 30%, 30%, 30%, 30% and 70%. The luminosity of these duty ratios reflected on the light is as shown in FIG. 9.

Figure 9:
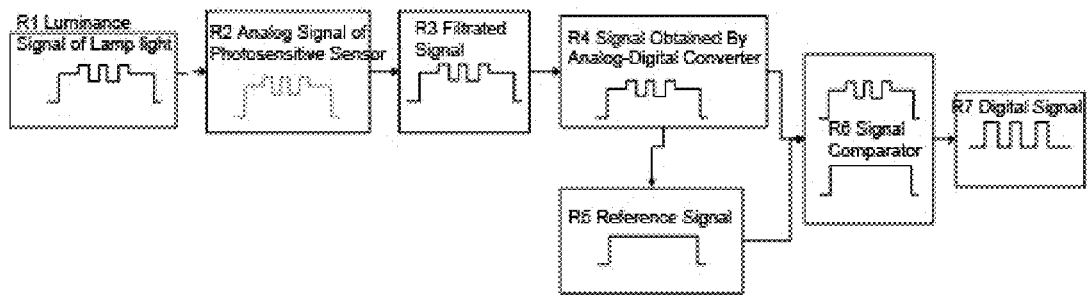
FIG. 9 is the process to decode the optical signal into digital signal.

As shown in FIG. 9, the signal receiving process of this invention is as follows:

Light signal D6 which is sent by transmitter is received by photosensitive sensor in light signal receiver L3D, due to light attenuation in the air medium and the limitation of the sensitivity of the sensor itself, the received analog signal can be expressed as:

$$S_{rec} = f(S_{send}) + N_{air}$$

Of which, $S_{send}$ is the original signal light at the light emitting end, $f()$ is attenuation function in the process of light propagation, $N_{air}$ is external noise signal. FIG. 4 is the schematic diagram for the $S_{rec}$ signal received. After the signal filtering by filter module, signal deburring will be conducted for photosensitive sensor analog signal R2, the filtrated signal R3 will be obtained, after analog-digital conversion for filtrated signal R3, the analog-digital converter obtains signal R4, through sampling average for the electric level within the duration of reference luminance calibration start cycle S2, reference signal R5 is obtained; input the signal R4 obtained by analog-digital converter and reference signal R5 to signal comparator R6 for signal comparison, digital signal R7 is obtained.

Figure 10:
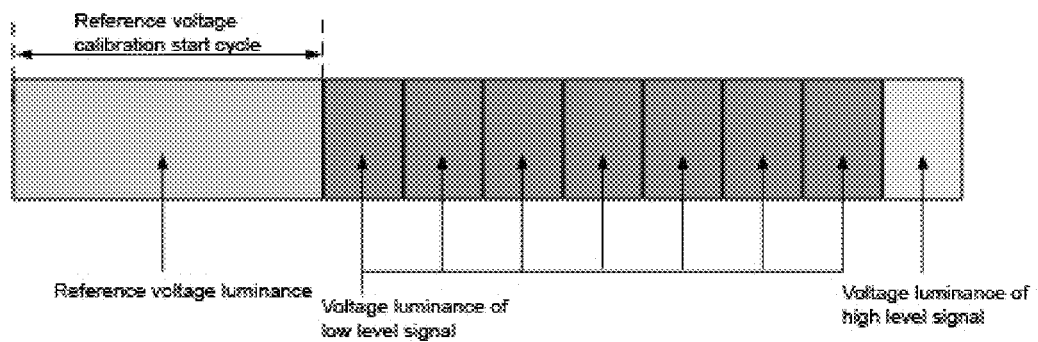
FIG. 10 is the luminosity diagram of voltage value on the lamplight.
Figure 11:
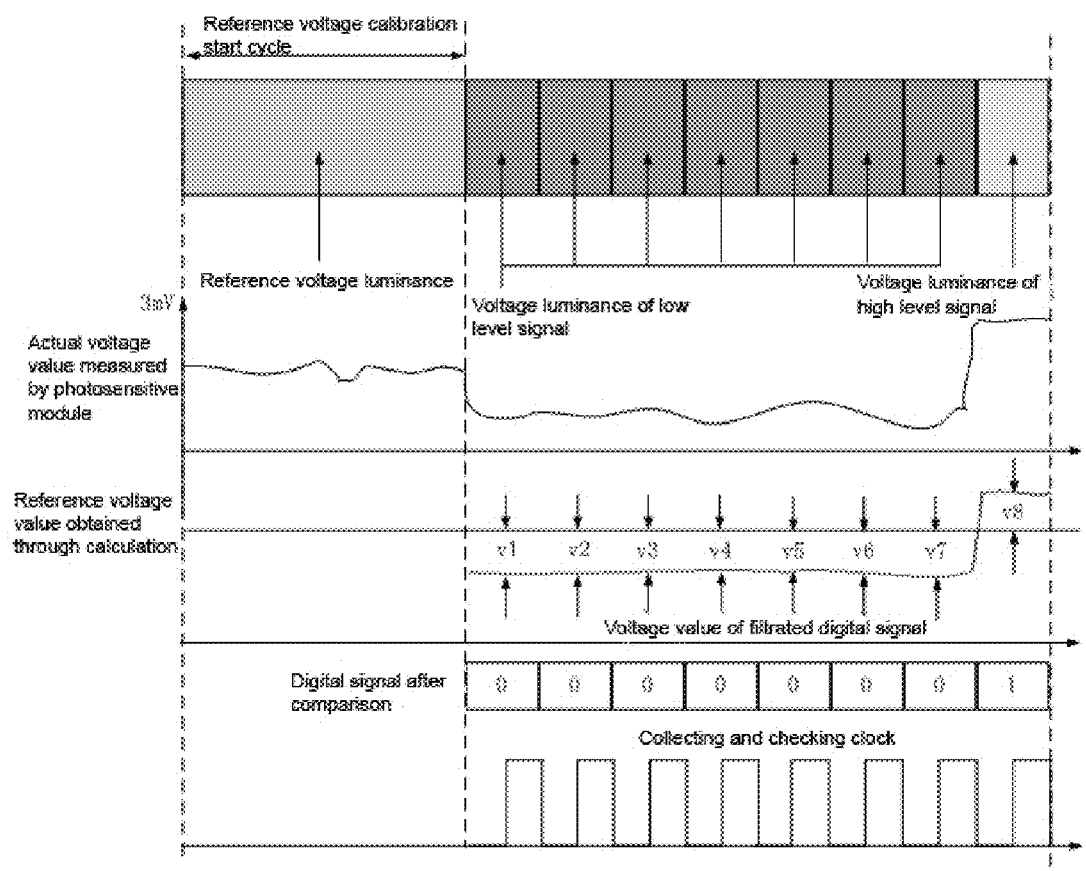
FIG. 11 is the schematic diagram of signal receiving process in this invention.

As shown in FIG. 10, when the lens of receiving device aligns with lamp light emitting apparatus of lamps, it can convert the luminance change it senses through photosensitive module into voltage value. We can see from FIG. 11 that, there are more interference signals and burrs for the actual voltage value measured by the photosensitive module, through the calculation of receiving end microcontroller, the calculated reference luminance voltage value is 1.5 mv, through the comparison of filtrated digital signal voltage value and reference voltage value 1.5 mv, the voltage difference obtained is respectively:

v1=−0.21 mv,v2=−0.20 mv,v3=−0.19 mv,v4=−0.19 mv,v5=−0.20 mv,v6=−0.21 mv,v7=−0.22 mv,v8=0.20 mv, then the digital signal after comparison is 0,0,0,0,0,0,0,1.

For the propagation of light signal in the air can be easily affected by weather and surrounding environment, in this implementation case, twin check mechanism including a physical protocol layer and a signal protocol layer is designed to ensure the accuracy of data received:

(1) Check of Physical Protocol Layer

In the physical protocol layer, sampling is made respectively within the two cycles including reference luminance calibration start cycle S2 and reference luminance calibration stop cycle S4 by receiving end microcontroller, the average values Vs and Ve for reference luminance voltage are obtained; if the voltage difference of these two reference voltages is greater than five percent, it will be judged that this section of signal is greatly affected by environmental light within the sending cycle, the receiving end microcontroller will discard the data received this time in the physical layer.

(2) Check of Signal Protocol Layer

After the data checked in physical layer is valid, further check will be done for the data received in signal protocol layer: assuming that the data that needs to be sent by lamp light emitting apparatus is:

00000001, 00000010, 00000011, 00000100, 00000101, 00000110, 00000111, 00001000, 00001001

While the data which is actually received by lamp light receiving apparatus of lamp is 00000011, 00000010, 00000011, 00000110, 00000101, 00000110, 00000111, 00001000, 00001001

We can discover from the data of implementation example that the receiving of the first digit and the fourth digit is wrong; through the check code calculation formula for the data, the check code of data sent is 3897, while the check code of received data which is calculated by receiving end microcontroller is 4407, we can find through comparison that the two check codes are inconsistent, so the signaling layer check fails, the receiving end microcontroller will automatically discard the data it receives.

An application example of this invention method in anti-collision of automobile:

Data sending and receiving are conducted according to the method in above implementation example, the lamp light receiving apparatus of rear automobile compares the speed $V_B$ and GPS position coordinates ($x_B$, $y_B$) of front automobile with its own speed $V_A$ and its own GPS positioning coordinates ($x_A$, $y_A$), then obtaining the time of collision that is about to happen to the two automobile, namely:

$$T = \frac{\sqrt{(x_B - x_A)^2 + (y_B - y_A)^2}}{V_A - V_B}$$

T is the time of collision obtained through calculation, when T is less than 2 s, it indicates there is a potential risk of collision, automobile A will begin fill oil to braking system; when T is less than 1 s, it indicates the risk of collision is further improved, collision will happen if braking measure is not adopted, so braking measure shall be adopted by controlling brake pedal.

In this implementation example, the layering of network communication protocol and the interrelation of various protocol layers are the same as those in the implementation example of above device; the specific process for twin check of data in physical protocol layer and signal protocol layer is the same as that in the implementation example of above device, it will not be repeated here.

What is claimed is:

1. An automobile lamp device comprises a head lamp arranged at the head of an automobile and a tail lamp arranged at the tail of the automobile, a lamp light receiving apparatus installed inside the head lamp; and a lamp light emitting apparatus installed inside the tail light, wherein the lamp light emitting apparatus comprising a bus data receiver, an emitting end microcontroller, a lamp driver and lamps;

the input end of said bus data receiver connects with an automobile's CAN bus, it's used to collect operating data of the automobile, and the input end of said emitting end microcontroller connects with the output end of the bus data receiver, it's used to acquire the operating data of the automobile and to check a code;

the output end of said emitting end microcontroller connects with the input end of said lamp driver, it's used to generate data after code check, and the output end of said lamp driver drives and connects with the tail lamps, it's used to drive the luminance of the tail lamps;

the tail lamps are used to generate light signals including the operating data of the automobile and to send them out;

the lamp light receiving apparatus is composed of lens, a photosensitive module and a receiving end microcontroller, the lens is used to conduct focusing processing for the light signal received and send the light signal processed to the photosensitive module which connects with an AD port of the receiving end microcontroller, it's used to send a voltage signal converted from the light signal to the receiving end microcontroller, the output end of said receiving end microcontroller connects with the input end of the automobile controller, it's used to conduct analog-digital conversion and filtering processing for the voltage signal it receives, and to conduct output control signal to the automobile controller;

the lamp light receiving apparatus and the lamp light emitting apparatus including a software protocol layer, a signal protocol layer and a physical protocol layer; the emitting end microcontroller and the receiving end microcontroller constitute the software protocol layer and the signal protocol layer; the lamp driver, the lamp, the lens and the photosensitive module constitute physical protocol layer; the software protocol layer is used for code checking and decoding for the data that needs to be sent and received, generating data package signal; the signal protocol layer is used to realize the combined coding for the key light signal and data package signal generated by the software protocol layer; the physical protocol layer is used to realize the mutual conversion between the digital signal and the optical signal.

2. The automobile lamp device of claim 1, wherein the photosensitive module receives the ray of light focused by the lens and samples the ray of light with a predetermined frequency, converts the optical signal after sampling into the voltage signal, then conducts operational amplification for the voltage signal; then it sends the amplified voltage signal to an AD acquisition port of the receiving end microcontroller, then processes the acquired signal and obtains the final digital signal, thus completing the receiving of digital signal.

3. The automobile lamp device of claim 1, wherein the data after the code check is the check code of data is obtained from the automobile's operational data through the code check, add the check code to the tail of automobile's operational data, then the data after the code check is obtained.

4. The automobile lamp device of claim 1, wherein the photosensitive module is photosensitive sensor.

5. A method for transferring signals through lamplight by device of claim 1 comprises following steps:
   (1) the lamp light receiving apparatus is set inside head lamps of a front automobile and a rear automobile, respectively, and the lamp light emitting apparatus is set inside tail lamps; the lamp light receiving apparatus and the lamp light emitting apparatus; the software protocol includes a check encoder; the signal protocol layer in the lamp light emitting apparatus includes a data package signal transmitter, a key light generator and a data signal generator; the signal protocol layer in the lamp light receiving apparatus includes a data package signal receiver; the physical protocol layer in the lamp light emitting apparatus includes a signal modulator and a lamplight generator; the physical protocol layer in lamp light receiving apparatus includes a light signal receiver and a signal demodulator;
   (2) the lamp light emitting apparatus of the front automobile collects its own operational data via a bus and the check encoder in the software protocol layer conducts the code check for the operational data, gets the check code of the operational data and sends the data after the code check to the data package signal transmitter; the check code is used for checking the data sent and received in the signal protocol layer;
   (3) the data signal generator in the signal protocol layer of the lamp light emitting apparatus in the front automobile waits for the rising edge of the key light signal generated by the key light generator, when it receives the rising edge signal, it will, according to the data package generated by the data package signal transmitter, generates a data signal waveform and combines the data signal waveform with the key light signal waveform, after signal modulation, it will generate an analog-modulated luminance signal, which will drive the tail lamps through a voltage driver together with a modulated PWM signal which corresponds to the analog-modulated luminance signal and generates an optical signal; through the luminance difference of optical signal, the data package that needs to be sent is contained in the tail lamps and sent to air medium in the form of luminance, and it's received by the rear automobile, thus data transmission is completed;
   (4) the photosensitive module in the light signal receiver in the physical protocol layer of the lamp light receiving apparatus in the rear automobile receives the optical signal sent by the front automobile, after filtering and deburring by a filter module for an analog signal received by the photosensitive module, the filtrated analog signal is obtained, then through analog-digital conversion for the filtrated analog signal, an analog-digital converter gets the signal, through sampling average for the electric level of reference voltage calibration start cycle, a reference signal is obtained; input the signal obtained by the analog-digital converter and the reference signal to the signal comparator for signal comparison, the digital signal is obtained, thus data receiving is completed.

6. The method for transferring signals according to claim 5, wherein the lamp light receiving apparatus of the rear automobile will compare the digital signal that it gets with its own position and speed data; obtaining the relative position relationship between the front automobile and the rear automobile; if there is a risk of collision, the rear automobile will take the corresponding braking measure.

7. The method for transferring signals according to claim 6, wherein the rear automobile receives the speed and position information sent by the front automobile and compares the information with its own speed and position information, obtaining the time of collision that is about to happen to the automobile, namely:

$$T = \frac{\sqrt{(x_B - x_A)^2 + (y_B - y_A)^2}}{V_A - V_B}$$

of which, T is the time of collision that is about to happen to the two automobile, when T is less than 2 s, indicating there is a potential risk of collision, the automobile controller of rear automobile will control the braking system to fill oil; when T is less than 1 s, the automobile controller of rear automobile will control brake pedal to take braking measure;
wherein $V_B$ represents the speed of front automobile;
$(x_B, y_B)$ represents GPS positioning coordinates of front automobile;
$V_A$ represents the speed of rear automobile;
$(x_A, y_A)$ represents the GPS positioning coordinates of rear automobile.

8. The method for transferring signals according to claim 6, wherein the analog signal received by said photosensitive module is:

$$S_{rec} = f(S_{send}) + N_{air}$$

wherein $S_{rec}$ is the analog signal received, $S_{send}$ is original optical signal, $f(\ )$ is attenuation function in the process of optical propagation, $N_{air}$ is outside noise signal.

9. The method for transferring signals according to claim 6, wherein a check coding method for the operational data of automobile in Step (2) is:

$$v = 256 \times \left(\sum_{i=0}^{N} f_1(d_i)\right) + \left(\sum_{i=0}^{N} f_2(d_i)\right)$$

$$f_1(d_i) = \sum_{j=0}^{7} ((d_i \& (1 << j)) >> j), i = 0, 1, 2, \ldots N$$

$$f_2(d_i) = \sum_{j=0}^{7} \overline{((d_i \& (1 << j)) >> j)}, i = 0, 1, 2, \ldots N$$

wherein N is the length of signal level, v is the final check code, the value range of $d_i$ is an integer from 0 to 255, $f_1(d_i)$ represents the number of binary digits whose value is 1 in $d_i$, $f_2(d_i)$ represents the number of binary digits whose value is 0 in $d_i$.

10. The method for transferring signals according to claim 6, wherein the signal protocol layer stipulates a reference luminance calibration start cycle as follows: set valid period of lamplight in the signal protocol layer; after the rising edge of valid period of lamplight is generated, the carrier luminance whose duration is the first predetermined cycle will be generated, and this first predetermined cycle is the reference luminance calibration start cycle.

11. The method for transferring signals according to claim 10, wherein the check code of data is obtained through the check coding of automobile's operational data, after the check code is added to the tail of automobile's operational data, the data after code check is obtained.

12. The method for transferring signals according to claim 11, the method for checking the data received in the physical protocol layer in the lamp light receiving apparatus: within the reference luminance calibration start cycle and the reference luminance calibration stop cycle, sample the optical signal received by the rear automobile respectively and obtain the two reference luminance voltage averages, if their voltage difference is greater than 5%, the signal received shall be deemed invalid, the data received this time shall be discarded; the aforesaid reference luminance calibration stop cycle means that the carrier luminance whose duration is the second predetermined cycle is sent after the data signal is sent, the duration of the second predetermined cycle is the reference luminance calibration stop cycle.

13. The method for transferring signals according to claim 12, wherein the method for checking the data sent and received in the signal protocol layer: when the data received in the physical protocol layer is valid, in the signal protocol layer of the lamp light receiving apparatus, when the data received by the rear automobile is inconsistent with the data sent from the front automobile in the check code, the data received this time shall be discarded.

\* \* \* \* \*